United States Patent [19]

Chaffin

[11] 4,190,509

[45] Feb. 26, 1980

[54] ELECTROCHEMICAL PROCESS FOR THE REMOVAL OF CONTAMINANTS FROM AQUEOUS MEDIUM

[75] Inventor: Charles M. Chaffin, Longview, Tex.

[73] Assignee: Eastman Kodak Company, Rochester, N.Y.

[21] Appl. No.: 13,857

[22] Filed: Feb. 22, 1979

[51] Int. Cl.$^2$ .................................................. C02C 5/12
[52] U.S. Cl. ................................. 204/152; 204/149
[58] Field of Search ........................ 204/152, 149, 1 R

[56] References Cited

U.S. PATENT DOCUMENTS

| | | | |
|---|---|---|---|
| 470,181 | 3/1892 | Collins | 204/149 X |
| 857,277 | 6/1907 | Harris | 204/152 |
| 1,194,000 | 8/1916 | Dobyns et al. | 204/149 X |
| 2,385,903 | 10/1945 | Winkelmann | 204/152 |
| 3,479,281 | 11/1969 | Kikindai et al. | 204/149 X |
| 3,523,891 | 8/1970 | Mehl | 204/149 X |
| 3,706,646 | 12/1972 | Gibson, Jr. et al. | 204/149 |
| 3,966,571 | 6/1976 | Gagnon et al. | 204/149 |

*Primary Examiner*—Arthur C. Prescott
*Attorney, Agent, or Firm*—Edward R. Weber; Daniel B. Reece, III

[57] ABSTRACT

Operation of an electrochemical contaminant removal process is improved by periodic vigorous agitation of the cell contents using a compressed gas.

5 Claims, No Drawings

ELECTROCHEMICAL PROCESS FOR THE REMOVAL OF CONTAMINANTS FROM AQUEOUS MEDIUM

This invention relates to methods and apparatus for the treatment of liquids to remove contaminants or pollutants, including metal ions, from them. More particularly, the invention is directed to an improvement in the treatment of process solutions, waste drains, rinse waters and effluents or purge streams from cooling towers and the wet scrubbing of contaminated gases, and the like.

Among the most difficult purification problems are those relating to removing small quantities of metallic or anionic radical contaminants from dilute aqueous solutions, such as rinse waters from chrome plating operations and purge streams from cooling tower waters that contain hexavalent chromium, usually as the chromate or dichromate, which is used to control corrosion and prevent microbiological growths and slimes from developing in such waters. Other problem treatment areas involve separation of cyanides, cyanates, arsenates, pyroarsenates, antimonates, selenates and other related salts from dilute aqueous solutions.

Prior art methods for the removal of wastes from liquid or aqueous media have included chemical reactions, drying, combustion, ion exchange, sorption, and electrolytic processes to convert the wastes to acceptable different compounds or to a concentrate them and make them more readily disposable. Recently a process has been patented (U.S. Pat. No. 3,926,754) whereby contaminating ions are removed from an aqueous media, e.g., hexavalent chromium ions removed from cooling tower waters, by an electrochemical method which includes formation of an insoluble iron compound or complex of the contaminant ion utilizing an anode of iron, iron alloy or insoluble iron compound. The hexavalent chromium contaminant, as chromate or dichromate, is changed to trivalent chromium, a less toxic form. The method is applicable to the removal of other contaminating ions, e.g., cyanide. In the process of U.S. Pat. No. 3,926,754 a contaminant containing stream is passed between an anode and cathode which have an electrical potential applied across them. As a result of this electrical potential, the contaminant and the iron in the anode combine to form an insoluble complex which may be removed from the cell effluent by filtration, settling, or other known methods of physical separation. A more specific description of the process is contained in U.S. Pat. No. 3,926,754, which is incorporated herein by reference.

In a laboratory or noncontinuous environment the aforementioned process works quite well. However, under continuous production operation it has been found that the electrical activity of the cell decreases with time requiring a regeneration of the system. One method which has been utilized to regenerate the system has been an acid wash using a 5–8% solution of a mineral acid. Regeneration using this procedure required an acid wash at least once a day. This regeneration required that the cell be taken off stream. It was therefore necessary to either disrupt the continuous process or provide a sufficient number of additional cells in order to divert the flow stream to an alternate cell while the contaminated cell was being regenerated. As will be appreciated, such a system of manipulation required additional materials for regeneration and increased the labor, thus increasing the overall costs of operation.

It has now been discovered that regeneration of the aforementioned electrochemical cells can be accomplished without an acid backwash. This improvement to the aforementioned process consists of modifying the electrochemical cell so as to permit the periodic introduction into the cell of a volume of a compressed gas. Most suitably the modification consists of the introduction of a perforated pipe near the bottom of the cell so configured as to provide a uniform distribution of gas bubbles throughout the horizontal cross-sectional area of the cell. As will be appreciated, any compressed gas may be used so long as it is unreactive with the media contained in the electrochemical cell. Under most circumstances, however, the preferred compressed gas will be air. The volume, pressure and duration of the gas injection may be varied to suit the needs of the particular operation. However, sufficient compressed gas should be provided to provide a thorough agitation throughout the cell. In a preferred embodiment compressed air at a pressure of from about 40 to about 80 psig is supplied to a cell at the rate of from about 4 to about 10 cubic feet per minute per square foot of cell cross-sectional area for a period of time of from about 5 to about 15 seconds. This compressed gas regeneration may be used as a total replacement for the prior art acid wash system or it may be used in conjunction with the acid wash system to reduce the frequency of acid washing as the requirements of the particular system require.

The improvements described in this invention significantly improve the operation of chromate removal unit as described in U.S. Pat. No. 3,926,754.

In a specific embodiment of this invention the equipment added to the aforementioned chromate removal cell includes a source of compressed air with an 80 psi working pressure, a piping system to deliver the air to the inlet of the cell, and ball valve at the cell.

The ball valve located at the feedwater inlet of the cell is rapidly opened to full open. After 5 to 15 seconds, the valve is fully closed. The air injection point is just below the flow distribution plate of the cell. The air and feed water flow concurrently upward through the distribution plate, between the steel plates, and out the outlet line located at the top of the cell.

The following exemplary descriptions will illustrate more fully a particular application of the instant invention, but it should be understood that they are not to be construed as limiting the invention in any way.

EXAMPLE I

| Parameter | Cell A | Cell B |
| --- | --- | --- |
| Water Feed Rate | 110 GPM @ 6 PPM $Cr^{+6}$ | 110 GPM @ 6 PM $Cr^{+6}$ |
| Cell Capacity | 200 GPM @ 10 PPM $Cr^{+6}$ | 200 GPM @ 10 PPM $Cr^{+6}$ |
| Conductivity | 2,200 $\mu$m | 2,200 $\mu$m |
| Acid Washes | 3 Per Week | 3 Per Week |
| Air Sparges | 1 of 20 Seconds Each 8 Hours | 1 of 20 Seconds Each 8 Hours |
| $Cr^{+6}$ Concentration in Cell | Air Volume 8 Cu Ft/Ft$^2$ <0.1 PPM | 8 Cu Ft/Ft$^2$ <0.1 PPM |

EXAMPLE I-continued

| Parameter | Cell A | Cell B |
|---|---|---|
| Effluent | | |

The air sparging of Cell A was discontinued. After 24 hours the effluent of Cell A contained 2 ppm $Cr^{+6}$ while the effluent of Cell B contained <0.1 ppm $Cr^{+6}$. It was necessary to acid wash Cell A once every 8 hours to maintain the $Cr^{+6}$ concentration at an acceptable level without the air sparge.

EXAMPLE II

| Parameter | Cell A | Cell B |
|---|---|---|
| Water Feed Rate | 170 GPM @ 6 PPM $Cr^{+6}$ | 170 GPM @ 6 PPM $Cr^{+6}$ |
| Cell Capacity | 200 GPM @ 10 PPM $Cr^{+6}$ | 200 GPM @ 10 PPM $Cr^{+6}$ |
| Cell Conductivity | 2,200 $\mu m$ | 2,200 $\mu m$ |
| Acid Washes | 3 Per Week | 3 Per Week |
| Air Sparges | 1 of 20 Seconds Each 8 hours | 1 of 20 Seconds Each 8 Hours |
| Air Volume | 8 Cu $Ft/Ft^2$ | 8 Cu $Ft/Ft^2$ |
| $Cr^{+6}$ Concentration in Cell Effluent | <0.1 PPM | <0.1 PPM |

The air sparging of Cell A was discontinued. After 12 hours, 1.2 ppm $Cr^{+6}$ was present in the effluent of Cell A. At this same time, the outlet water from Cell B contained only 0.1 ppm $Cr^{+6}$. In order to continue satisfactory operation of Cell A without air sparging, it was necessary to acid wash the cell once each eight hours.

The invention has been described in detail with particular reference to certain preferred embodiments thereof, but it will be understood that variations and modifications can be effected within the spirit and scope of the invention.

We claim:

1. In a method for electrochemically removing from an ionizing medium a contaminant ion which is capable of forming an insoluble iron compound or complex, which comprises passing an electric current through the ionizing medium containing the ion to be removed between an anode which has a surface or a portion of a surface thereof of iron, iron alloy or insoluble iron compound, and a cathode so as to produce anodically an insoluble iron compound, species or complex in said ionizing medium while cathodically reacting said contaminant ion with the ionizing medium to generate an insoluble hydroxide thereof and whereby an insoluble iron compound or complex with the contaminant ion is produced, and removing said insoluble iron compound or complex with the contaminant ion from the ionizing medium, the improvement wherein the medium contained between the anode and the cathode is periodically vigorously agitated with a compressed gas.

2. Process according to claim 1 wherein the compressed gas is air.

3. Process according to claim 1 wherein the compressed gas has a pressure of from about 40 to about 80 pounds per square inch.

4. Process according to claim 1 wherein the medium is agitated with the compressed gas for a period of from about 5 to about 15 seconds.

5. Process according to claim 1 wherein the compressed gas is supplied at the rate of from about 4 to about 10 cubic feet per minute of compressed gas per square foot of cross sectional area of ionizing medium.

* * * * *